Patented Mar. 11, 1941

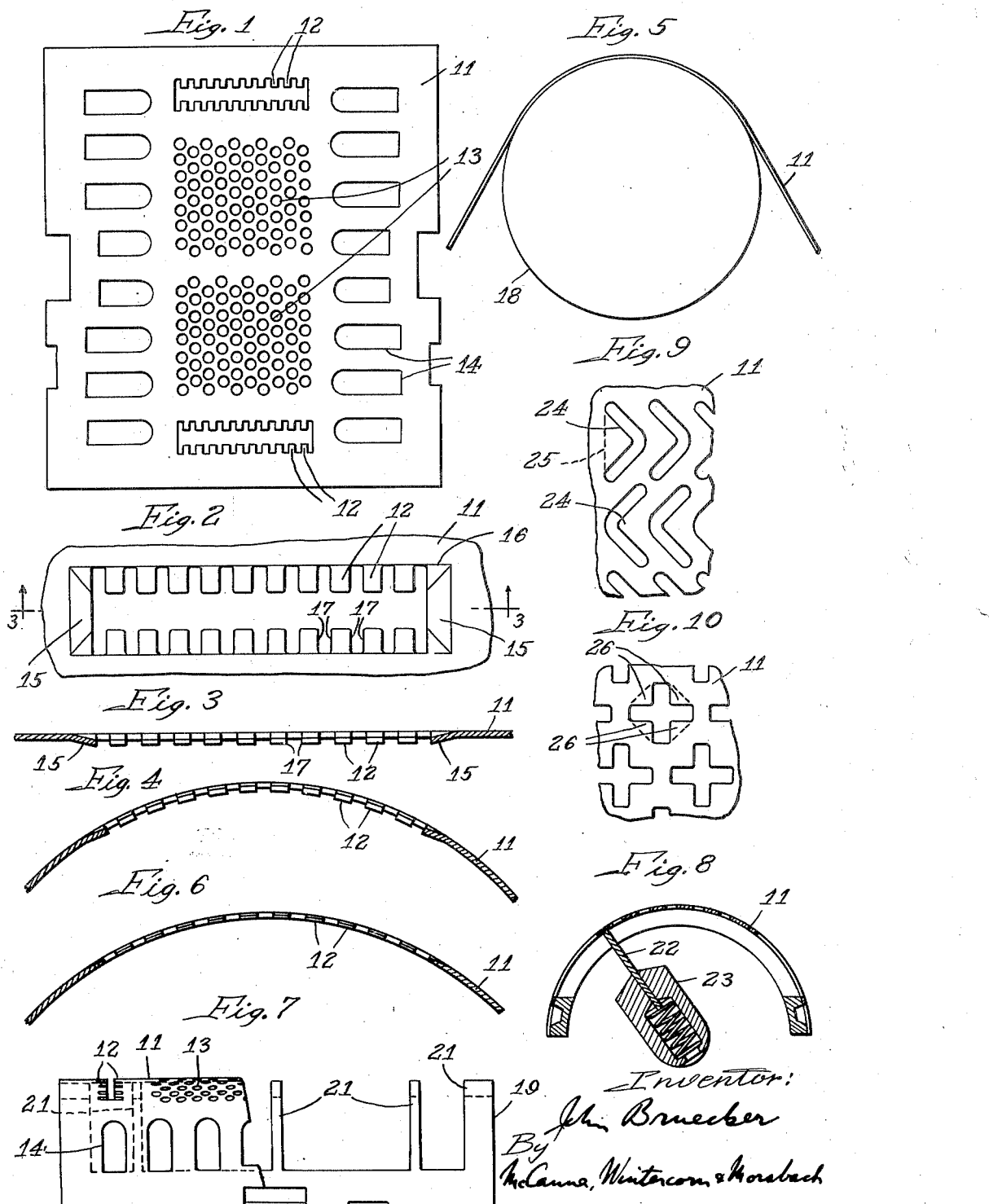

2,234,894

UNITED STATES PATENT OFFICE 2,234,894

PROCESS OF MAKING COMB FOR SHAVING IMPLEMENTS

John Bruecker, Chicago, Ill.

Application November 22, 1939, Serial No. 305,713

2 Claims. (Cl. 76—104)

This invention relates to the manufacture of a skin-engaging shearing member or comb adapted for use in a dry shaver and has more particular reference to the problem of making small shearing teeth which will function satisfactorily in a shaver of this type.

An object of my invention is to provide an improved process of making a shearing member or comb of the character described having small shearing teeth which will have good edge-holding properties and will not irritate the skin and which will be sufficiently durable to maintain these characteristics in continued use.

Another object is to provide a process of making small shearing teeth of the character described adapted both for close shaving of the average stubble beard and for clipping longer and more irregular beard hairs.

Another object of my invention is to provide a process of making a skin-engaging shearing member or comb characterized by blanking or perforating a plate of thin tempered steel to form the profile shape of the teeth, bending the free ends of the teeth to a set angle with relation to the body of the plate, flexing or bending the plate to a curvature approximating that which it occupies in cooperation with a movable cutting member, and grinding or lapping the inner side of the plate as well as the teeth while maintained in said curvature.

Another object of my invention is to improve the manufacture of a shearing member of the character described with the view to reducing the cost thereof.

Referring to the drawing in which I have shown several embodiments:

Fig. 1 is an enlarged plan view of a shearing member or comb punched or blanked to shape in accordance with one of the steps of my invention;

Fig. 2 is a further enlargement of a fragmentary portion of said shearing member showing a forming operation;

Fig. 3 is a section taken on the section line 3—3 of Fig. 2;

Fig. 4 is a similar view but showing the following operation of flexing or bending;

Fig. 5 is a view on a smaller scale showing the lapping or grinding operation;

Fig. 6 is a view similar to Fig. 4 but following the lapping or grinding operation;

Fig. 7 is a fragmentary side elevation showing the thin member applied to a supporting frame;

Fig. 8 is a cross-section through the shearing member and a movable cutter in cooperation therewith; and Figs. 9 and 10 are enlarged fragmentary plan views showing modified forms of small teeth made in accordance with my invention.

The thin shearing member in which the small teeth are to be formed in accordance with my invention may be used in dry shavers having characteristics generally similar to my co-pending application Serial No. 178,221, filed December 6, 1937, for "Shaving implement." The shearing member is preferably formed from thin resilient steel sheet or plate stock which is properly tempered to give good edge-holding properties for the cutting edges. Also, in the preferred embodiment, this thin member is secured to a skeleton-like supporting frame having accurately finished arched ribs to which the thin member conforms. As taught in my prior application, the thin member and the supporting frame constitute a replaceable unit and the thin member may be united to the supporting frame by any of various means or methods.

The present invention deals primarily with the manufacture of a skin-engaging shearing member of the character described and more particularly with the incorporation in said member of small tooth-like formations of a kind adapted not only for close shaving, but also for picking up or engaging beneath long or irregular hairs and for functioning to position them across the shearing edges so that they will be cut off by co-action with a movable cutter. In Fig. 1 I have shown a thin shearing member 11 of the character described which may be of a few thousandths in thickness, say approximately from .002" to .004" and which may be of any suitable or preferred shape consistent with the invention. In the initial process of manufacture this member is punched or perforated by one or more operations to provide hair-receiving openings. In the form here shown small teeth 12 are blanked to the general shape disclosed in my prior application and openings 13 providing cutting edges of a different shape are punched in the central area. The openings 14 at both sides of these areas are for the discharge of cut hair. The openings 13 and 14 are not essential so far as my present invention is concerned. However, the main shaving area covered by the openings 13 may embody small openings providing tooth-like cutting elements in keeping with my present invention. This may be a series of rows of teeth such as 12, or small tooth formations such as shown in the modified forms, Figs. 9 and 10, or any small tooth formations having the shape characteristics of the present invention.

After punching or blanking the teeth 12 these teeth are bent inwardly to a set angular relation with respect to the flat plate 11. This angular relation is shown in Fig. 3, as corresponding with the angle of the end portions 15, and in this particular case the bending is performed substantially along the base line of the teeth in a rectangular form indicated by 16. The thin member is then flexed approximately to the curvature which it is intended to keep in its final operative condition in cooperation with the movable cutter. This curvature is indicated in Fig. 4 and in the flexing of the thin member or plate to this position the projecting teeth are caused to bend back to an angular position preferably just short of their original position. This outward displacement of the teeth is caused by reason of stressing the metal between the teeth and the contiguous body portion of the thin plate by reason of flexing or bending the thin plate. This leaves the outer face of the teeth slightly inclined inwardly and likewise the inner edges 17 slight projecting at the inner surface of the plate. Following this the inner surface of the thin plate is lapped or ground while maintaining the plate in the curvature just described. This grinding operation is shown diagrammatically in Fig. 5 in which the abrasive tool 18 has a radius approximately that to which the thin plate is to occupy in its final operative condition. Roughing and finishing grinding operations may be used. This step in the process is covered in my Patent No. 2,182,067, granted December 5, 1939. In Fig. 6 is shown the tooth portion after the grinding operation, it being noted that the inner faces of the small teeth are flush with the inner surface of the thin plate 11. In this grinding or lapping operation the small teeth are accurately finished at their inner sides and the cutting edges 17 are ground to a high degree of precision so that they will be maintained in the desired co-relation with the movable cutter.

Figs. 7 and 8 show the thin plate 11 applied to a skeleton supporting frame designated generally by 19 having arched ribs 21 to which the thin plate is conformed and secured, as disclosed in my above mentioned application. Here also is shown a cutter blade 22 carried in a holder 23 mounted to oscillate about a center concentric with the inner surface of the thin plate 11. In actual operation in a dry shaver the cutter blade oscillates very rapidly and is urged by centrifugal force or spring pressure, or both, into intimate shearing engagement with the side of the thin member 11 and the cutting edges 17. My present invention is not, however, confined to this type of cutter.

In Figs. 9 and 10 I have shown modified forms of small teeth, the manufacture of which is carried out similar to the teeth 12, as above described. In Fig. 9 the teeth 24 are V-shaped or crescent shaped and each tooth projects into an opening of similar shape. Here, each tooth 24 is bent inwardly substantially along the dotted line 25 corresponding with the operation shown in Fig. 2. In Fig. 10 the teeth 26 are quarterly spaced and project into a cross-shaped opening. These teeth are formed in a manner similar to the teeth 24. The tooth formations of Figs. 9 and 10 may be used effectively in place of the small openings 13, or they may comprise the entire tooth structure in a dry shaver.

While I have shown a particular embodiment of my invention, it will be understood that I do not wish to be limited thereto since many modifications may be made, and I therefore contemplate by the appended claims to cover any such modifications as fall within the true spirit and scope of my invention.

I claim:

1. The process of forming small shearing teeth projecting from a thin resilient steel plate which is used as the skin-engaging shearing member of a shaving implement, including the steps of forming the plate to provide the profile shape of the teeth, bending the teeth to a set position toward the shearing edge side of the plate, flexing the plate to position the toothed portion in an arc and thereby causing the teeth to bend back to an angular position just short of their original position by inherent stress between the metal of the teeth and the contiguous portion of the plate, and lapping the inner side of the plate together with the projecting inner face of the teeth by a lapping tool the face of which is of an arc approximately that of the cutting tool with which the shearing member is intended for use.

2. The process of making a skin-engaging shearing member for a shaving implement including the steps of perforating a thin resilient steel plate to provide a plurality of small projecting teeth, one side of which is for movement over the skin and the other is adapted to provide shearing edges, bending the teeth inwardly toward the shearing edge side to a set angular position with relation to the face of the plate, flexing the perforated portion of the plate to approximately the curvature it will occupy when in operative position in a shaving implement, said flexing step causing the teeth to bend outwardly to a lesser angular relation to the inner face of the member with certain of the shearing edges of the teeth projecting inwardly beyond said inner face, and grinding the interior surface of the perforated portion together with the inner face of the teeth by means of a grinding tool having a radius approximately that of the curvature to which the perforated portion is flexed.

JOHN BRUECKER.